United States Patent [19]

Kostiner

[11] 4,154,526
[45] May 15, 1979

[54] BLACK BORDER PRINTER FOR PHOTOGRAPHIC PRINTS

[76] Inventor: Edward Kostiner, 218 Oakridge Dr., Baie d'Urfe, Quebec, Canada

[21] Appl. No.: 891,814
[22] Filed: Mar. 30, 1978
[51] Int. Cl.$^2$ .................................. G03B 27/58
[52] U.S. Cl. .................................. 355/74; 354/107; 355/113
[58] Field of Search .................. 355/72, 74, 113; 354/103, 105, 107

[56] References Cited

U.S. PATENT DOCUMENTS

| | | | |
|---|---|---|---|
| 1,818,528 | 8/1931 | Bern | 355/72 |
| 2,110,279 | 3/1938 | Sloan | 355/74 |
| 2,454,032 | 11/1948 | Boulais, Jr. | 355/72 |
| 2,544,883 | 3/1951 | Isaac et al. | 355/74 |
| 3,136,232 | 6/1964 | Shoberg | 355/113 |
| 3,788,737 | 1/1974 | Kidd | 355/113 X |

*Primary Examiner*—Richard A. Wintercorn
*Attorney, Agent, or Firm*—Larson, Taylor and Hinds

[57] ABSTRACT

An apparatus is disclosed for printing a border on a photographic print. The apparatus is particularly useful for printing black borders which have always been difficult and costly to produce. The apparatus includes a light source within an enclosure having a translucent flat top surface to emit light and a straight edge at one side thereof, the enclosure having sides formed from opaque material. A further flat surface is positioned in the same plane as the translucent surface extending from the straight edge, a platen is formed from opaque material extending over the translucent surface with a sealing and pressure strip over the straight edge, a right angle corner frame positioned on the translucent surface with one arm having an edge parallel to the straight edge, an adjustable guide means for the corner frame and a locking means for locating the corner frame in a position on a linear path.

12 Claims, 11 Drawing Figures

BLACK BORDER PRINTER FOR PHOTOGRAPHIC PRINTS

This invention relates to the preparation of photographic prints and more specifically this invention relates to an apparatus for printing a border, particularly a black border on a photographic print.

Printers and enlargers are standard equipment used in darkrooms throughout the world. In the case of an enlarger, the photographic paper is mounted on a special easel which has adjustable masking strips to both hold the printing paper in place and prevent light from exposing the border of the printing paper. Thus, when a print is developed, the border of the paper which was under the masking strip appears white. The majority of printers used today are in the form of a box with a translucent top surface having adjustable masking strips so that the printing paper has a border which is not exposed to light during the printing step. Thus, the developed prints all have white borders.

In some photographic prints, it has been found that the picture is enhanced by a black border rather than a white border. In the past, the preparation of a black border has been a cumbersome process requiring a special block placed over the photographic paper after the image has been exposed by a printer or enlarger, and then exposing the edges of the photographic paper to light so that the resultant print has a black border. Such a process required special blocks for each size of photographic image, was difficult to center, and in some cases produced a fuzzy edge between the black border and the image.

The present apparatus provides an edge printing device which prints a black border of even thickness around the edges of a photographic print. The black border may have a white strip adjacent the image giving a matt effect. Special masks or negatives may be used with the edge printing device to indicate the name of the photographer or the name of the artist. In other embodiments, special designs of border may be incorporated with this printing device so that the edge of the picture has a special design around one side or all sides of the picture image. In another embodiment, the present invention provides a useful light for viewing negatives. It may also be used as a safelight when the top platen or cover is made from material which is partially translucent and of the correct filter colour to give out sufficient light to work in a darkroom, but not enough to fog standard photographic material.

The present invention provides an apparatus for printing a border on a photographic print comprising, light source within an enclosure having a translucent flat top surface to emit light and a straight edge at one side thereof, the enclosure having sides formed from opaque material, further flat surface in the same plane as the translucent surface and extending from the straight edge, platen formed from opaque material extending over the translucent surface, the platen preventing light emitting from the enclosure, being removable and having a sealing and pressure strip extending along the straight edge, right angle corner frame having an edge of one arm parallel to the straight edge for aligning a photographic print, adjustable guide means for moving the corner frame in a linear path such that the edge of the one arm is always parallel to the straight edge, and locking means for locating the corner frame at any position on the linear path.

In drawings which illustrate embodiments of the invention,

Figure 3:
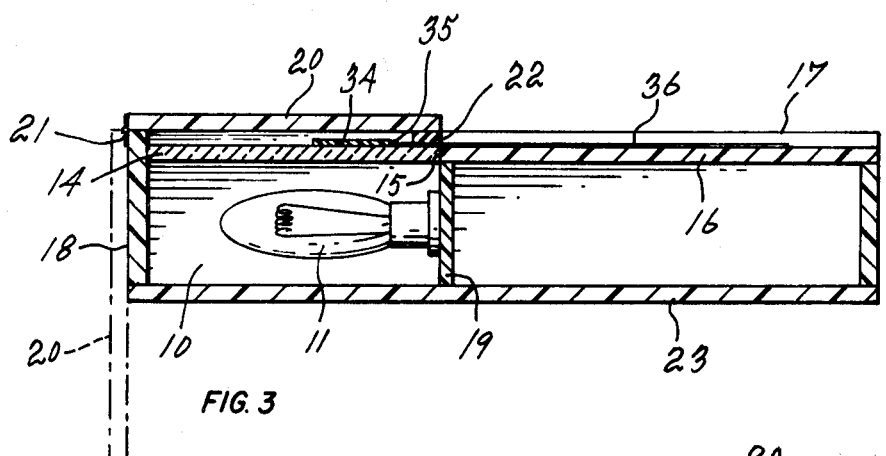
FIG. 3 is a cross-sectional view taken at line 3—3 in FIG. 1.

Referring now to FIGS. 1 to 4, a printing device of the present invention is shown wherein a light sealed enclosure 10 contains a light source as shown in FIG. 3. The light source is one or more light bulbs 11 which are electrically connected by cable 12 and plug 13 to a normal household power outlet (not shown). On top of the enclosure 10 is a translucent flat sheet 14 having a straight edge 15 at one side thereof to which is joined a horizontal opaque flat panel 16, in one embodiment the panel 16 is a black acrylic plastic sheet. The panel 16 has a top surface in the same plane as the top surface of the translucent sheet 14, thus, a sheet of paper lies on both surfaces. Two side panels 17, a back panel 18 and an intermediate panel 19 surround the enclosure 10 and prevent light emitting from the enclosure 10 except through the translucent sheet 14. The two side panels 17 and the back panel 18 extend slightly above the top surface of the translucent sheet 14 and the horizontal panel 16. A cover or platen 20 formed from opaque or safelight material extends over the translucent sheet 14, resting on the edges of the side panels 17 and the back panel 18. Thus, a space is provided between the underside of the platen 20 and the top surface of the translucent sheet 14, for use to be explained later. The platen 20 has a hinge 21 at one side which joins the platen 20 to the edge of the back panel 18. In a preferred embodiment, the hinge 21 is spring loaded or counterbalanced so that the platen 20 may be opened and remains in any desired position. A light sealing strip 22 made of sponge rubber or other compressible material extends along the front edge of the platen 20 such that when in the close position, the strip 22 extends along the straight edge 15 between the translucent sheet 14 and the horizontal panel 16, from the straight edge 15 over the horizontal panel 16.

Apart from the translucent sheet 14, all the other panels and cover are formed from opaque material. This may include black acrylic sheet, plywood, sheet metal or other opaque sheet material which transmits no light whatsoever.

A removable base panel 23 is fitted to the underside of the printing device. The base panel 23 ensures the enclosure 10 is sealed even if the device is raised off the table or bench. An on/off siwtch 24 located on one side panel 17 operates the light 11 in the enclosure 10.

In yet another embodiment, the platen 20 may be opened completely and rests adjacent and parallel to the back as shown chain dotted in FIG. 3. The device then sits at an angle and becomes a stand which can be used for viewing negatives and the like, through the translucent sheet 14.

The two side panels 17 extend for the full width of the translucent sheet 14 and the horizontal panel 16. A groove or slot 25 in the horizontal surface of the translucent sheet 14 and horizontal panel 16 extends adjacent and substantially parallel to one of the side panels 17. A sliding portion 26 fits exactly into the slot 25 and forms one arm of a right angle corner frame 27. The slot 25 is perpendicular to the straight edge 15 between the translucent sheet 14 and the horizontal panel 16. The sliding portion 26 moves within the slot 25 and allows the right angle corner frame 27 to move backwards and forwards in a linear path which is perpendicular to the straight edge 15. A gap is provided in the light sealing strip 22 where the sliding portion 26 passes therethrough. When the platen 20 is closed, no light can escape anywhere along the sealing strip 22 or around the sliding portion 26. A knob 28 on one end of the sliding portion 26 permits the corner frame 17 to be moved within the sliding path. A further slot 29 in the sliding portion 26 extends in the same direction as the linear path fitting over a stud 30 located on the horizontal panel 16 in the slot 25. A wing nut 31 fits onto the stud 30 and when tightened locates the sliding portion in a fixed position in the slot 25. Thus, when the wing nut 31 is released, the sliding portion 26 slides easily in the slot 25, and when the wing nut 31 is tightened, the sliding portion 26 is locked in a particular location. A pointer 32 on one side of the sliding portion 26 points to a scale 33 adjacent a side panel 17. In another embodiment, the further slot 29 shown in FIG. 2 to be in the sliding portion 26, may be in the horizontal panel 16 at the base of the slot 25. The stud 30 extends through the further slot and when the wing nut 31 is tightened, the corner frame 27 is locked in the same manner.

Figure 1:
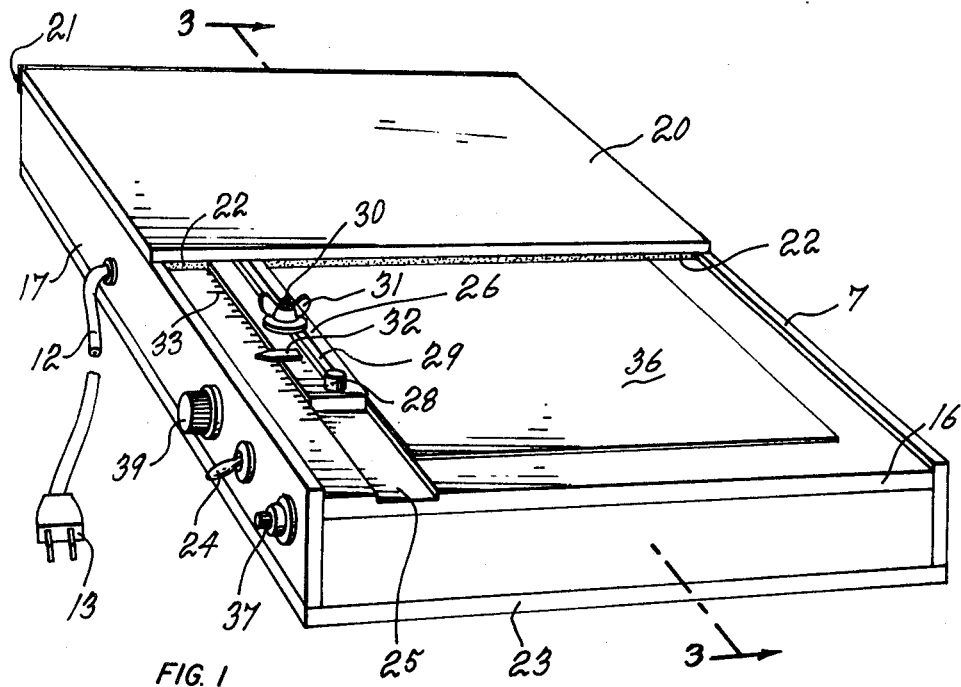
FIG. 1 is an isometric view of one embodiment of the printing device of the present invention.
Figure 2:
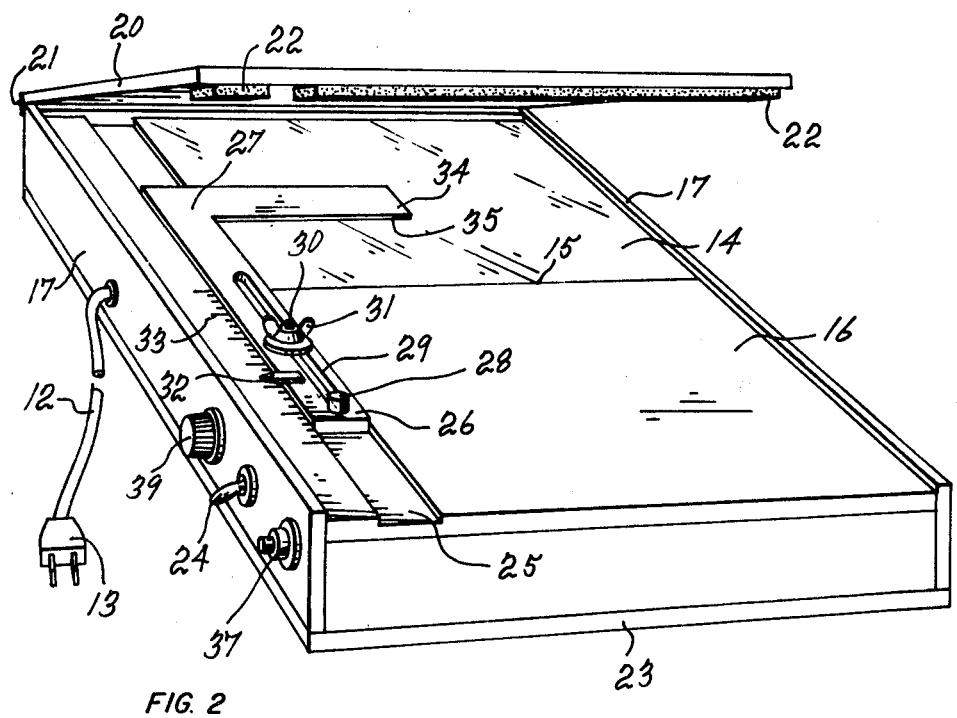
FIG. 2 is an isometric view of the printing device shown in FIG. 1 with the cover raised.

The corner frame 27 has a horizontal arm 34 which extends parallel to the straight edge 15. The horizontal arm 34 fits within the space between the underside of the platen 20 and the top surface of the translucent sheet 14 and does not affect the closing and light sealing of the platen 20. The horizontal arm 34 has a front edge 35 which is parallel to the straight edge 15. FIGS. 1 and 3 show a sheet of photographic paper 36 in place of the printer. The corner of the photographic sheet 36 rests in the right angle corner frame 27 with one edge along the front edge 35 of the horizontal arm 34 and an adjacent edge along the sliding portion 26. The platen 20 is closed and the sealing strip 22 presses down on the paper 36 to insure that it is flat along the straight edge 15 between the translucent sheet 14 and the horizontal panel 16. The border thickness or width is determined by the pointer 32 reading on the scale 33. Adjustment of the sliding portion 26, up and down the slot 25, gives an exact indication of the thickness of the border to be printed on the paper 36. A momentary switch 37 allows the light 11 to be turned on to illuminate the enclosure 10, and shine light through the translucent panel 14 onto the border of the photographic paper 36 which, when printed, becomes a black border.

Figure 5:
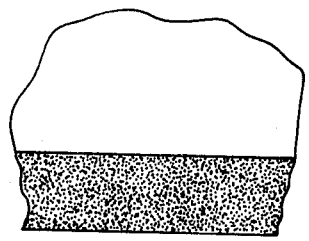
FIGS. 5 to 11 illustrate examples of different types of borders that may be printed with the printing device of the present invention.

In operation, it is first necessary to take the photographic paper and print the picture image on the paper by a normal enlarger or printer. The photographic paper 36 is then taken straight from the enlarger or printer for insertion into the border print device of the present invention with the emulsion side of the paper facing downwards. First of all, the thickness of the border is selected. This is done by means of the indicator 32 on the scale 33. The right angle corner frame 27 is moved backwards and forwards and the distance between the straight edge 15 and the front edge 33 of the horizontal arm 34 determines the border thickness. The paper 36 is placed into the right angle corner frame 27, the platen 20 lowered and the sealing strip 22 flattens the paper 36 along the straight edge 15. This flattening insures a crisp even edge to the border on the resulting print. The momentary switch 37 is pressed for a sufficient period of time to expose the photographic print so that light is emitted from the light bulb 11 through the translucent sheet 14 onto the border of the paper 36. After one border is exposed, the paper 36 is turned through 90° and inserted again. This is done for all four sides of the paper 36 so that all four sides of the paper have been exposed to the printer. The border size may be equal all around the print or, alternatively, one or two borders may be wider than the others. In this case, it is necessary to adjust the position of the corner frame 27 between printing each border. It is not always desired to have black borders on all four sides, and in this case, only the sides of the paper 36 requiring printing are exposed. The paper 36 is then developed in a normal manner, and the black border appears where it has been exposed, as shown in FIG. 5.

Figure 6:
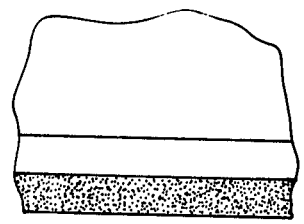

In some cases, it is preferred to have a black border on the outside of the paper and a white strip between the black border and the photographic image, commonly known as matt effect, as shown in FIG. 6. This can be done by insuring that when the picture image is exposed on the photographic paper, the border that is masked during the image exposure is of sufficient width to allow for a black border to be printed on the edge of the paper. For example, if the total width of the border is $\frac{1}{2}$", the black border strip may be $\frac{1}{4}$", leaving a $\frac{1}{4}$" white strip.

Figure 8:
Figure 9:
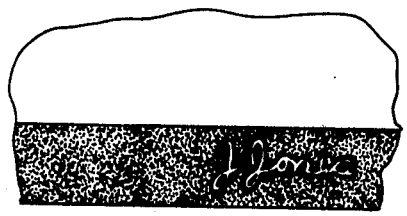

For another use of the present invention, the straight edge may have a special opaque mask inserted on top of the translucent sheet 14 such as a scalloped edge or some other design which masks the paper only allowing light to a portion of the border. In another embodiment, a special opaque negative or mask is prepared having a translucent signature thereon. The mask is then used for printing on the bottom edge of the paper and the resulting photographic print has the signature in black on a white border, as ahown in FIG. 8. In another embodiment, the mask is translucent and the signature or name is opaque so that the border appears as a black border with a white signature or name theron, as shown in FIG. 9.

Figure 4:
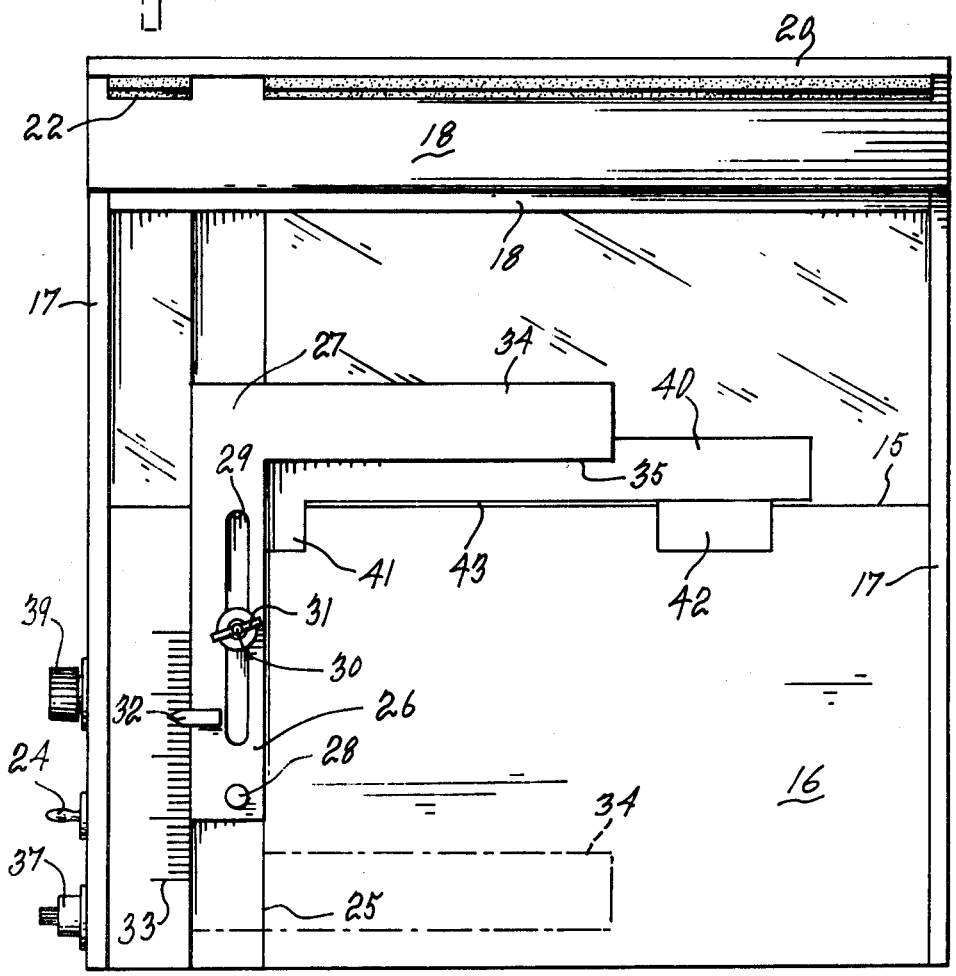
FIG. 4 is a plan view of the printing device shown in FIG. 1 with the platen open and a special printing mask in place.
Figure 10:
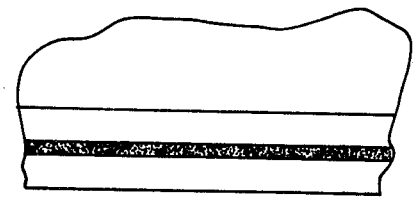

A special mask is shown in FIG. 4 which may be used for other types of borders. A thin opaque strip 40 is positioned so that it is under the arm 34 of the corner frame 27. The strip 40 has one edge parallel to the straight edge 15 and, on the side of the corner frame 27, has a tab 41 of predetermined width, and on the other side of the strip 40 is an outer tab 42 which may be moved up and down the length of the strip 40. As shown in FIG. 4, the printer is set to print a border with a central black line such as that shown in FIG. 10. The paper fits into the corner frame 27 with outside edge being masked by the opaque strip 40. A thin slit 43 between the strip 40 and the straight edge 15 prints a black line on the paper. The tab 41 prevents the printed strip extending to the edge of the paper. The width of this tab 41 is set by the width of border on the paper. The outer tab 42 is positioned dependent upon the width of paper to prevent the printed strip extending to the edge of the paper.

Figure 7:
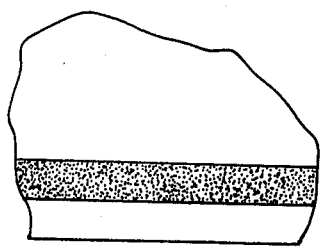
Figure 11:
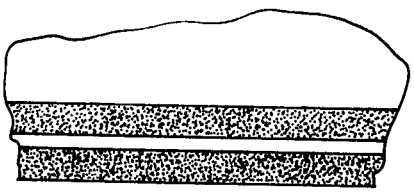

If the thin slit 43 is widened to extend to the edge of th image, then a border such as that shown in FIG. 7 is produced. Furthermore, by using a double printing step with the mask, as shown in FIG. 4, and without the mask, and insuring a strip in the centre of the border which is not exposed, a border such as that shown in FIG. 11 may be produced.

The masking arrangement shown in FIG. 4 may be taped to the translucent sheet 14 or may be an integral part of the unit connected to the arm 34 of the corner frame 27 or the sides of the unit. Adjustments in position of strip 40 must be made with one edge of the strip 40 always parallel to the straight edge 15.

In another embodiment the corner frame 27 may be reversed as shown chain dotted in FIG. 4, so that the arm 34 is positioned over the horizontal panel 16. This changes the alignment of the paper from one edge over the translucent surface to the other edge over the horizontal panel 16. This allows for special effects and full pressure from the top platen over the entire surface being exposed.

As well as being used for a border printer, the present device may also be used as a negative reader. This may be done by opening the platen 20 to the full open position, as shown in chain dotted in FIG. 3, setting the device to stand on the platen 20, and turning on th light 11 by means of the on/off switch 24. The translucent sheet 4 then shows as a light surface. Negatives may be placed thereon for viewing before printing. In yet another embodiment of the present invention, the platen 20 is made from coloured acrylic sheet material which has low light emission that does not affect photographic film or paper. The device may be used as a safelight in a darkroom with the light 11 switched on. In yet another embodiment, a variable rheostat dimmer switch 39 may be incorporated so that the light intensity from the bulb may be varied for exposure control, or be calibrated to convert the viewing box to a densimeter. This allows full control by means of calibration of exposure and thus can control the denseness of the black in the border. As a still further embodiment, the device may be used as a contact proof sheet printer utilizing an extra platen to press down on the surface of the sheet area.

It will be apparent to those skilled in the art that a number of changes may be made to the present invention without departing from the scope of the invention which is only limited by the claims. For instance, the sliding of the right angle corner frame need not be in a special groove or slot 25, as shown, the important point is that this right angle corner frame must move in a restricted path so that the front edge 35 of the horizontal arm 34 is always parallel to the straight edge 15. In this way, the width of the border always remains even. Similarly, the method of holding or locking the right angle corner frame to the horizontal panel 16 may be a friction locking device which slides with the right angle corner frame.

The embodiments of the invention in which an exclusive property or privilege is claimed are defined as follows:

1. An apparatus for printing a border on a photographic print comprising:
   light source within an enclosure having a translucent flat top surface to emit light and a straight edge at one side thereof, the enclosure having sides formed from opaque material,
   further flat surface in the same plane as the translucent surface and extending from the straight edge,
   platen formed from opaque material extending over the translucent surface, preventing light emitting from the enclosure, the platen being removable and having a sealing and pressure strip extending along the straight edge,
   right angle corner frame having an edge of one arm parallel to the straight edge for aligning a photographic print,
   adjustable guide means for moving the corner frame in a linear path such that the edge of the one arm is always parallel to the straight edge, and
   locking means for locating the corner frame at any position on the linear path.

2. The apparatus according to claim 1, wherein the translucent surface is rectangular in shape and the platen is hinged at an edge of the translucent surface on the opposite side to the straight edge.

3. The apparatus according to claim 2, wherein the platen is spring loaded to remain in an open position.

4. The apparatus according to claim 1, including a momentary switch, an on/off switch, and a variable rheostat dimmer switch adapted to operate the light source.

5. The apparatus according to claim 1, including a scale positioned on the further flat surface and a pointer positioned on the corner frame adapted to indicate on the scale the distance between the edge of the one arm on the corner frame and the straight edge.

6. The apparatus according to claim 1, wherein the other arm on the corner frame moves in a slot perpendicular to the straight edge, and the locking means comprises a wing nut and a threaded stud.

7. The apparatus according to claim 1, including a thin masking strip with variable spaced side tabs for location in the corner frame parallel to the straight edge.

8. The apparatus according to claim 1, wherein the platen is made from coloured acrylic sheet material which has low light emission that does not affect photographic film or paper.

9. The apparatus according to claim 1, wherein the platen may be opened to a position adjacent one side of the enclosure and becomes a stand.

10. The apparatus according to claim 1 wherein a gap is left between the platen and the translucent surface and the arm of the corner frame parallel to the straight edge is positioned on the translucent surface.

11. The apparatus according to claim 1 wherein the arm of the corner frame parallel to the straight edge is positioned on the further flat surface.

12. The apparatus according to claim 10 wherein the location of the arm of the corner frame parallel to the straight edge is interchangeable between the translucent surface and the further flat surface.

* * * * *